(12) United States Patent
Miyauchi

(10) Patent No.: US 8,199,806 B2
(45) Date of Patent: *Jun. 12, 2012

(54) CONTENTS PROVIDING APPARATUS AND CONTENTS PROVIDING METHOD

(75) Inventor: Hiroyuki Miyauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1284 days.

This patent is subject to a terminal disclaimer.

(21) Appl. No.: 11/896,888

(22) Filed: Sep. 6, 2007

(65) Prior Publication Data

US 2008/0069243 A1   Mar. 20, 2008

(30) Foreign Application Priority Data

Sep. 20, 2006   (JP) ................... 2006-254702

(51) Int. Cl.
  *H04N 7/12* (2006.01)
  *H04N 5/93* (2006.01)
(52) U.S. Cl. .................. 375/240.01; 386/353
(58) Field of Classification Search .............. None
  See application file for complete search history.

(56) References Cited

U.S. PATENT DOCUMENTS

| | | | | |
|---|---|---|---|---|
| 5,748,835 A | * | 5/1998 | Lee ............... | 386/339 |
| 6,148,142 A | * | 11/2000 | Anderson ............ | 386/206 |
| 6,324,515 B1 | * | 11/2001 | Rabipour et al. ........... | 704/500 |
| 6,628,891 B1 | * | 9/2003 | Vantalon et al. ........... | 386/255 |
| 2003/0021346 A1 | * | 1/2003 | Bixby et al. .......... | 375/240.25 |
| 2004/0233997 A1 | * | 11/2004 | Umesako ............. | 375/240.26 |
| 2005/0196143 A1 | * | 9/2005 | Kato et al. ............ | 386/69 |
| 2006/0114136 A1 | * | 6/2006 | Chu et al. ............ | 341/52 |
| 2006/0140080 A1 | * | 6/2006 | Yen et al. ........... | 369/47.1 |
| 2008/0247728 A1 | * | 10/2008 | Witham ............. | 386/68 |
| 2009/0123081 A1 | * | 5/2009 | DeLuca ............. | 382/234 |

FOREIGN PATENT DOCUMENTS

WO   WO-00/51347   8/2000

OTHER PUBLICATIONS

Official Action dated Feb. 26, 2010, issued in counterpart Mexican application No. Mx/a/2007/011206, with English translation (3 pages total).
U.S. Appl. No. 11/898,437, filed Sep. 12, 2007, to Miyauchi.

* cited by examiner

*Primary Examiner* — Clemence Han
(74) *Attorney, Agent, or Firm* — Finnegan, Henderson, Farabow, Garrett & Dunner, L.L.P.

(57) ABSTRACT

A contents providing apparatus includes a storage which records contents with plural types of formats, output ports which respectively output the contents, decoders which are connected to the output ports and respectively correspond to the formats, channels which respectively provide contents decoded by the decoders, a switcher which selectively derives one of outputs of the decoders to a specified one of the channels, a table which expresses the output ports respectively assigned to the channels and formats corresponding to the decoders connected to the output ports, and a controller to select, based on the table, one of the output ports which corresponds to the format of the specified contents and is assigned to the specified channel.

6 Claims, 4 Drawing Sheets

| Format | Output port | Condition | | Output CH |
|---|---|---|---|---|
| A | 1 | During use | | 2 |
| | 3 | Available | | |
| | 4 | Available | | |
| B | 2 | Available (detected) | → | 1 |
| | 5 | Available | | |
| | 6 | Available | | |

CONTENTS PROVIDING APPARATUS AND CONTENTS PROVIDING METHOD

CROSS-REFERENCE TO RELATED APPLICATIONS

This application is based upon and claims the benefit of priority from prior Japanese Patent Application No. 2006-254702, filed Sep. 20, 2006, the entire contents of which are incorporated herein by reference.

BACKGROUND OF THE INVENTION

1. Field of the Invention

This invention relates to a contents providing apparatus and contents providing method which provide contents with a plurality of different coding formats.

2. Description of the Related Art

Video contents and audio contents are encoded according to coding formats used in respective nonlinear editors. In order to provide contents with plural types of coding formats by use of a contents providing apparatus, it is necessary to provide decoders which can cope with the respective coding formats. In a general contents providing apparatus, since one decoder board is directly connected to one output channel, the contents providing apparatus cannot output contents with a coding format different from that of the decoder from the output channel and a desired output channel cannot be freely selected.

There is proposed a method for nonlinearly editing a coding format without standardizing the coding formats even when contents with plural types of coding formats is provided together by using a multi-format decoder which can decode the contents with plural types of coding formats (for example, refer to the International Patent Disclosure No. WO00/51347).

BRIEF SUMMARY OF THE INVENTION

An object of this invention is to provide a contents providing apparatus and contents providing method which can output contents from a desired output channel irrespective of the format of the contents even when contents with plural types of coding formats is provided together.

According to one aspect of the present invention, there is provided a contents providing apparatus comprising storage which records contents with plural types of formats and reads contents specified to be reproduced, a plurality of output ports which respectively output contents read from the storage, a plurality of decoders which are connected to the output ports and respectively correspond to the plural types of formats, a plurality of channels which respectively provide contents decoded by the decoders, a switcher which selectively derives one of outputs of the decoders to a specified one of the channels, a table which expresses the output ports respectively assigned to the channels and formats corresponding to the decoders connected to the output ports, and a controller to select, based on the table, one of the output ports which corresponds to the format of the specified contents and is assigned to the specified channel, and to connect an output of the decoder connected to the selected output port to the specified channel via the switcher.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described an embodiment of the present invention in detail with reference to the accompanying drawings.

Figure 1:
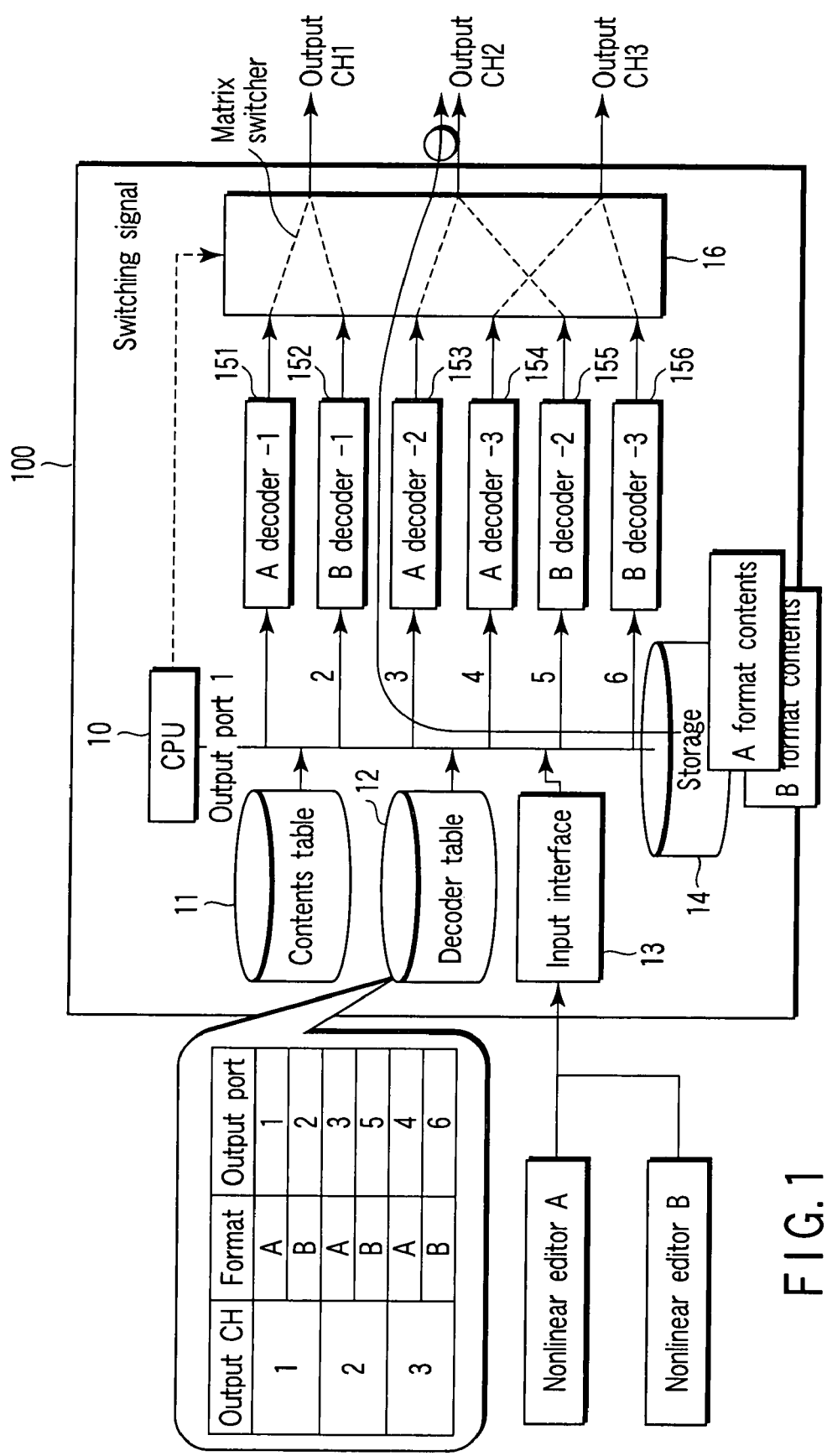
FIG. 1 is a block diagram showing one embodiment of a contents providing apparatus according to this invention.

FIG. 1 is a block diagram showing the configuration of one embodiment of a contents providing apparatus according to this invention.

A contents providing apparatus 100 includes a central processing unit (CPU) 10, contents table 11, decoder table 12, input interface 13, storage 14 configured by a RAM or hard disk, decoders 151 to 156 and matrix switcher 16.

Nonlinear editors A and B are connected to the input interface 13. The nonlinear editors A and B transfer video contents with different coding formats to the contents providing apparatus 100. For example, it is supposed that the nonlinear editor A generates video contents coded in a Moving Picture Experts Group Phase 2 (MPEG-2) form and the nonlinear editor B generates video contents coded in a Digital Video (DV) form. In this case, the contents transfer source is not limited to the nonlinear editor, but another server system or the like may be used. Further, the contents is not limited to the video contents, but audio contents can also be used.

The CPU 10 causes the input interface 13 to fetch video contents transferred from the nonlinear editors A and B and records the same into the storage 14. In this example, it is supposed that the video contents transferred from the nonlinear editor A is set to have an A format contents and the video contents transferred from the nonlinear editor B is set to have a B format contents. Further, at the time of recording the contents, the CPU 10 acquires format information of to-be-recorded contents from the nonlinear editor of the contents transfer source and stores the same into the contents table 11.

In addition, the contents providing apparatus 100 includes six output ports (to which port numbers 1 to 6 are respectively assigned) which derive video contents selectively read from the storage 14 in response to instructions from the CPU 10. The decoders 151, 153, 154 for the A format are connected to the output ports with the port numbers 1, 3, 4. Further, the decoders 152, 155, 156 for the B format are connected to the output ports with the port numbers 2, 5, 6. The decoders 151 to 156 decode the contents of the respective formats to broadcast video data items. Outputs of the decoders 151 to 156 are selectively derived to three-series output channels CH1, CH2, CH3 via the matrix switcher 16.

The decoders 151 to 156 are managed by the decoder table 12 previously expressing the corresponding relation between the output channels, formats and output ports. For example, as shown in FIG. 1, two decoders of A and B formats are set to correspond to each of the output channels CH1, CH2, CH3 in the decoder table 12. The CPU 10 gives a switching signal to the matrix switcher 16 based on the decoder table 12. The matrix switcher 16 performs a switching operation to connect the output port of the specified decoder to the specified output channel according to the switching signal given from the CPU 10.

Next, the operation of the contents providing apparatus 100 with the above configuration is explained.

(Contents Recording Process)

Figures 2, 3:
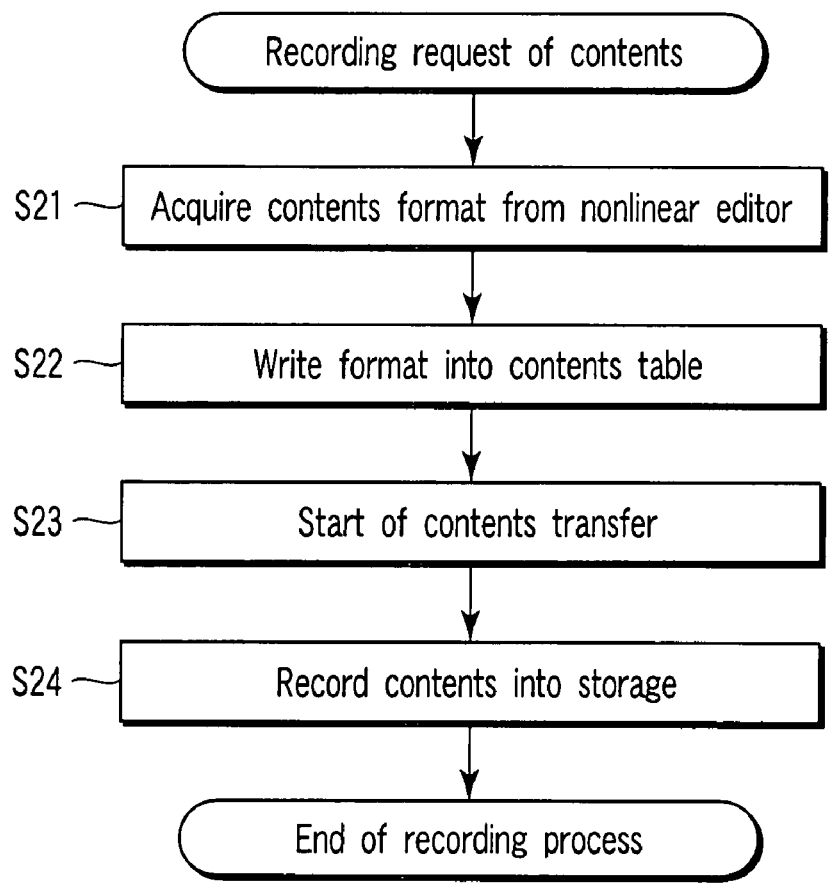
FIG. 2 is a flowchart for illustrating the procedure of a contents recording process of the contents providing apparatus shown in FIG. 1.
FIG. 3 is a diagram showing one example of a contents table.

FIG. 2 is a flowchart for illustrating the procedure of a contents recording process of the contents providing apparatus 100.

When receiving a recording request of contents from the nonlinear editor A or B, the CPU 10 acquires format (CODEC form) information and the like of the contents from the nonlinear editor of a request source (step S21). The CPU 10 writes the acquired format information into the contents table 11 (step S22). FIG. 3 is a diagram showing one example of the configuration of the contents table 11. As shown in FIG. 3, in the contents table 11, formats (CODEC forms), contents names, the lengths of the contents and the like are stored in correspondence to contents IDs which express the contents. The CPU 10 instructs a nonlinear editor of a request source to start transfer of the contents data (step S23) and records the contents data input via the input interface 13 into the storage 14 (step S24).

(Contents Reproducing Process)

Figures 4, 5:
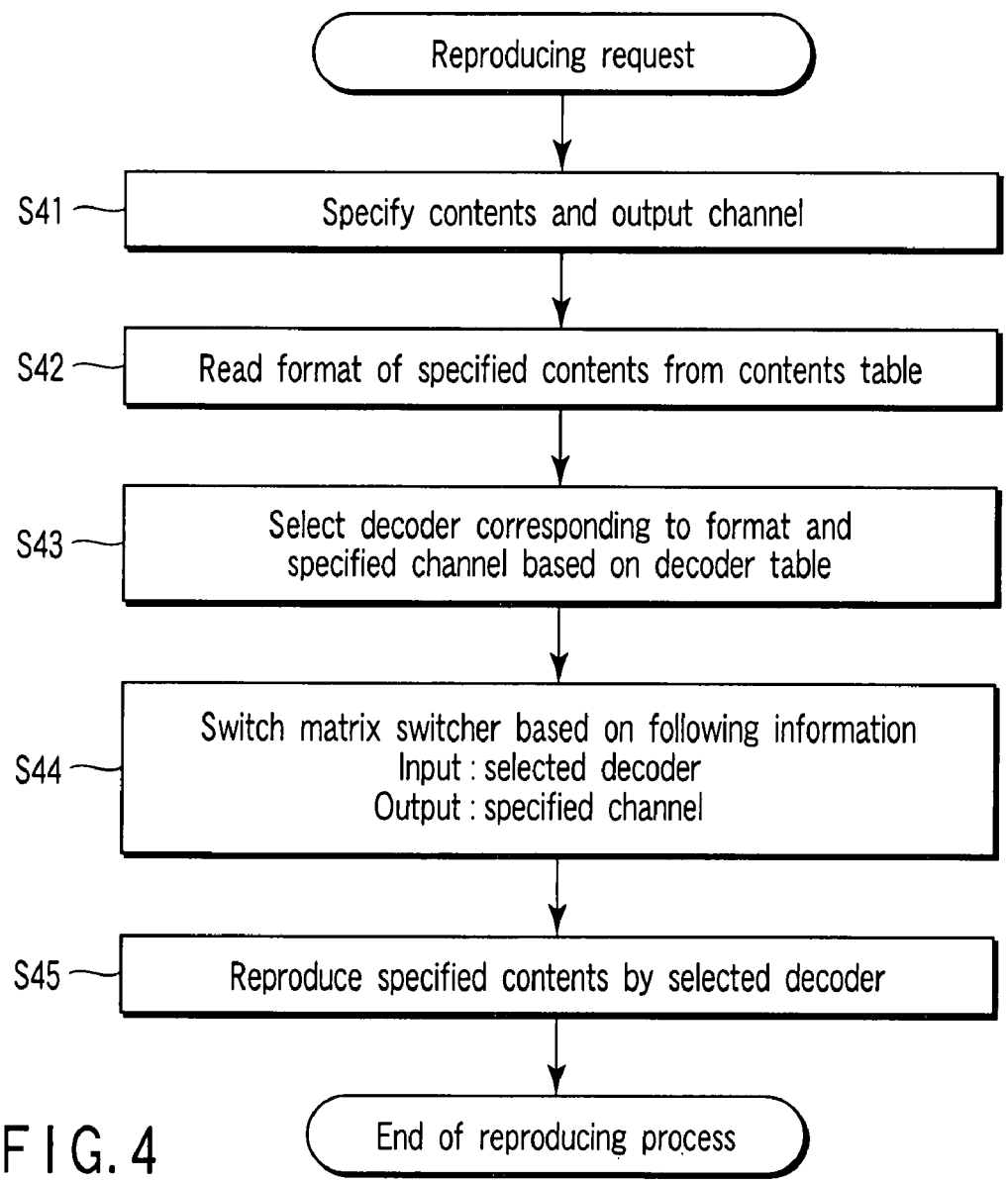
FIG. 4 is a flowchart for illustrating the procedure of a contents reproducing process of the contents providing apparatus shown in FIG. 1.
FIG. 5 is a diagram showing another example of the configuration of a decoder table.

FIG. 4 is a flowchart for illustrating the procedure of a contents reproducing process of the contents providing apparatus.

First, the CPU 10 receives specification of a to-be-reproduced contents and an output channel (step S41) and reads a format (CODEC form) of the specified contents from the contents table 11 (step S42). Further, the CPU 10 refers to the decoder table 12 to select a decoder corresponding to the format of the contents based on the specification of the output channel (step S43).

The CPU 10 transmits a switching signal to the matrix switcher 16 and performs a control operation to switch the output terminal of the selected decoder to the specified output channel (step S44). The CPU 10 decodes and reproduces the specified contents by use of the selected decoder (step S45).

For example, in the case of FIG. 1, when it is specified to output contents with the A format from the output channel CH2, the CPU 10 reads format information of the contents from the contents table 11 and determines that it corresponds to the A format. Then, the CPU 10 refers to the decoder table 12 to select an output port 3 to which the decoder 153 corresponding to the A format set to correspond to the output channel CH2 is connected and switch the output terminal of the decoder 153 to the output channel CH2 by use of the matrix switcher 16. As a result, the contents decoded by the decoder 153 is output from the specified output channel CH2.

Conventionally, since each decoder is treated to correspond to one output channel irrespective of the format, contents data cannot be output to the output channel of a decoder with a different format and an output channel for the contents cannot be freely selected.

On the other hand, in the present embodiment, when decoders with plural types of formats (m types) are connected to the contents providing apparatus, m×n decoders and a switcher which selectively switches the decoders and outputs data are provided in order to attain a plurality of output channels (n channels). When the contents providing apparatus receives a reproducing request of a contents, it specifies one of the decoders corresponding to the format of the contents and performs a control operation to switch the output terminal of the specified decoder to the output terminal of the specified channel. With the above configuration, it is possible to output reproduced data from a desired output channel without causing the user to pay any attention to the decoder and the format type of the contents.

This invention is not limited to the above embodiment. For example, the decoder table 12 can be configured as shown in FIG. 5. As shown in FIG. 5, in the decoder table 12, output ports which are grouped for each format type are stored. At this time, the service conditions (during use/available) of the decoders connected to the respective output ports are also stored.

Figure 6:
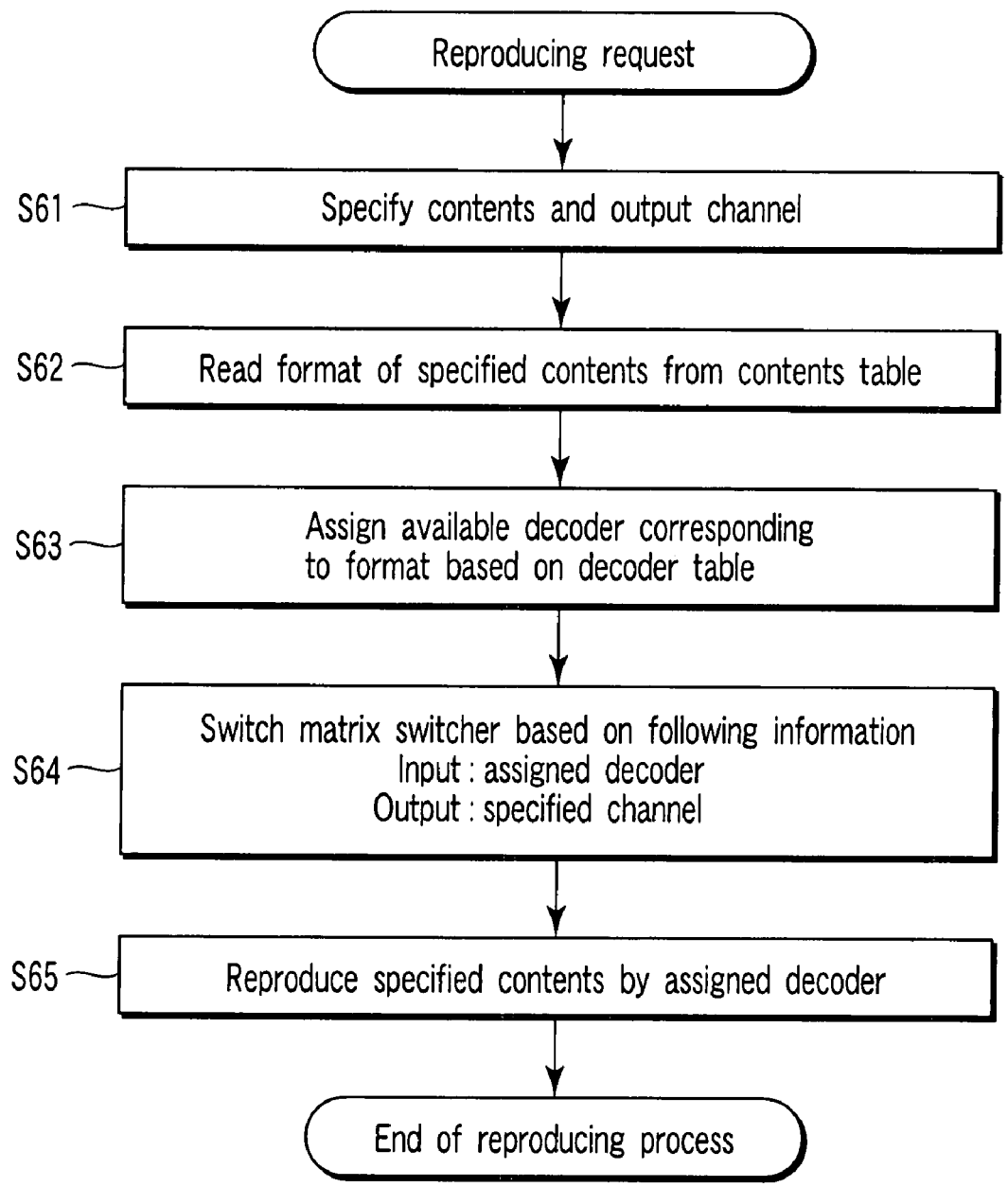
FIG. 6 is a flowchart for illustrating the procedure of a contents reproducing process of the contents providing apparatus when the decoder table shown in FIG. 5 is used.

FIG. 6 is a flowchart for illustrating the procedure of a contents reproducing process when the decoder table 12 with the above configuration is used.

Like the case of FIG. 4, first, the CPU 10 receives specification of a to-be-reproduced contents and an output channel (step S61) and reads a format (CODEC form) of the specified contents from the contents table 11 (step S62).

Further, the CPU 10 refers to the decoder table 12 to assign an available decoder corresponding to the specified contents format (step S63). Then, the CPU 10 switches the matrix switcher 16 based on input/output information of the specified output channel and the assigned available decoder (step S64). The CPU 10 decodes and reproduces the specified contents by use of the assigned decoder (step S65).

With the above configuration, in the contents providing apparatus in which plural types of formats of a plurality of contents are provided together, reproduced data can be output from a desired output channel. Further, with the above configuration, a decoder which is available is preferentially assigned according to the service conditions of the decoders, and therefore, the convenience thereof is further enhanced. In addition, the numbers of output channels and formats of the contents supported by the contents providing apparatus 100 can also be freely and selectively set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A contents providing apparatus comprising:
   storage which records contents with plural types of formats and reads contents specified to be reproduced,
   a plurality of output ports which respectively output contents read from the storage,
   a plurality of decoders which are connected to the output ports and respectively correspond to the plural types of formats,
   a plurality of channels which respectively provide contents decoded by the decoders, a switcher which selectively derives one of outputs of the decoders to a specified one of the channels, a table which expresses the output ports respectively assigned to the channels and formats corresponding to the decoders connected to the output ports, and a controller to select, based on the table, one of the output ports which corresponds to the format of the specified contents and is assigned to the specified channel, and to connect an output of the decoder connected to the selected output port to the specified channel via the switcher.

2. The contents providing apparatus according to claim 1, wherein the number of decoders is set to m×n when the number of types of formats of the contents is set to m and the number of channels is set to n.

3. A contents providing apparatus comprising:

storage which records contents with plural types of formats and reads contents specified to be reproduced, a plurality of output ports which respectively output contents read from the storage, a plurality of decoders which are connected to the output ports and respectively correspond to the plural types of formats, a plurality of channels which respectively provide contents decoded by the decoders, a switcher which selectively derives one of outputs of the decoders to a specified one of the channels, a table which expresses the output ports to which the decoders corresponding to the plural types of formats are connected and service conditions of the decoders, and a controller to assign, based on the table, one of the output ports which corresponds to the format of the specified contents and is available, and to connect an output of the decoder connected to the assigned output port to the specified channel via the switcher.

4. A method used for a contents providing apparatus including storage which records contents with plural types of formats and reads contents specified to be reproduced, a plurality of output ports which respectively output contents read from the storage, a plurality of decoders which are connected to the output ports and respectively correspond to the plural types of formats, a plurality of channels which respectively provide contents decoded by the decoders, a switcher which selectively derives one of outputs of the decoders to a specified one of the channels, and a table which expresses the output ports respectively assigned to the channels and formats corresponding to the decoders connected to the output ports, comprising:

selecting, based on the table, one of the output ports which corresponds to the format of the specified contents and is assigned to the specified channel, and connecting an output of the decoder connected to the selected output port to the specified channel via the switcher.

5. The method according to claim 4, wherein the number of decoders is set to m×n when the number of types of formats of the contents is set to m and the number of channels is set to n.

6. A method used for a contents providing apparatus including storage which records contents with plural types of formats and reads contents specified to be reproduced, a plurality of output ports which respectively output contents read from the storage, a plurality of decoders which are connected to the output ports and respectively correspond to the plural types of formats, a plurality of channels which provide contents decoded by the decoders, a switcher which selectively derives one of outputs of the decoders to a specified one of the channels, and a table which expresses the output ports to which the decoders corresponding to the plural types of formats are connected and service conditions of the decoders thereof, comprising:

assigning, based on the table, one of the output ports which corresponds to the format of the specified contents and is available, and connecting an output of the decoder connected to the assigned output port to the specified channel via the switcher.

* * * * *